United States Patent Office 3,084,135
Patented Apr. 2, 1963

3,084,135
VINYL HALIDE COMPOSITIONS STABILIZED
WITH MELAMINE
James P. Scullin, Pompton Lakes, N.J., assignor to
Heyden Newport Chemical Corporation, New York,
N.Y., a corporation of Delaware
No Drawing. Filed June 8, 1960, Ser. No. 34,614
6 Claims. (Cl. 260—41)

This invention relates to improved vinyl halide compositions. More particularly it relates to vinyl halide compositions which are resistant to the deteriorating effects of heat.

Vinyl halide resins have properties which make them desirable materials for use in a wide variety of applications. For example, their excellent abrasion resistance, high gloss, and good resistance to water and to alkalies have resulted in their use in floor coverings, wall coverings, shoe soles and heels, and the like. The vinyl halide resins are commonly fabricated into useful articles by the application of heat in milling, calendering, or molding operations. The resins so treated tend to decompose somewhat at the elevated temperatures required as is evidenced by the development of color. This decomposition is especially pronounced when scrape portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl resin compositions that can withstand without darkening or otherwise deteriorating the heating to which they may be subjected during processing as well as subsequent prolonged heating of the finished products.

Now in accordance with the present invention it has been found that vinyl halide compositions having excellent resistance to thermal degradation are produced by employing as stabilizer certain compounds having in their structural formulas the group

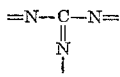

This group may form a portion of an s-triazine ring. In this case the compounds have the formula

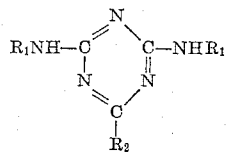

in which $R_1$ in each case represents a hydrogen atom, a phenyl group, an alkyl group containing 1 to 5 carbon atoms, or a carbon atom in an s-triazine ring and $R_2$ represents an amino group, a substituted amino group, such as an alkylamino or a phenylamino group, or a phenyl group. Illustrative of compounds having this structure which have proven to be excellent stabilizers for vinyl halide resins are melamine, lower alkyl melamines, such as methylmelamines and propylmelamines, phenylmelamines, and benzoguanamine. Melam and melem, which are the products of the reaction between 2 moles and 3 moles, respectively, of melamine, may also be employed as stabilizers in the novel compositions.

In addition the useful stabilizers include acyclic compounds having the formula

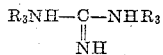

in which $R_3$ represents a hydrogen atom, a phenyl group, a cyano group, or an alkyl group containing from 1 to 5 carbon atoms. Illustrative of these compounds are guanidine, dicyandiamide, and melaniline.

Salts of the aforementioned compounds may also be used to stabilize the compositions of the present invention. These may include, for example, the carbonate, hydrochloride, and sulfate salts.

A single stabilizing compound or a mixture of two or more of these compounds may be used in the preparation of the stabilized vinyl halide compositions. For example, a mixture of melamine and dicyandiamide; a mixture of melamine, dicyandiamide, and guanidine carbonate; or a mixture of melamine and melam may be used. In addition to the aforementioned compounds, the stabilizer may contain one or more of the previously known heat and light stabilizers for vinyl halide resins. These include, for example, metal soaps, metal phenates, and organic phosphites. The useful metal soaps are the salts formed from such metals as cadmium, barium, zinc, calcium, tin, lead, antimony, and magnesium and a fatty acid containing from 2 to 18 carbons or an aromatic acid such as benzoic acid or p-tertiary butylbenzoic acid. The effective metal phenates are salts formed from the aforementioned metals and a phenol or a mono- or dialkylphenol in which the alkyl group contains from 4 to 12 carbon atoms. Trialkylphosphites, triarylphosphites, and alkylarylphosphites have all proven useful as stabilizers for vinyl halide resins. The preferred metal soaps are cadmium salts of benzoic acid, p-t-butylbenzoic acid, or straight chain and branched chain alkanoic acids which contain from 6 to 12 carbon atoms. The preferred metal phenates are barium salts of alkylphenols, such as n-nonylphenol or dibutylphenol. Among the useful organic phosphites are triphenylphosphite, tris (isooctyl) phosphite, monooctyl diphenyl phosphite, and p-tert. octylphenyl isooctyl phosphite.

To form products having the desired heat stability, the compositions should contain approximately 0.3 to 10 and preferably 1 to 5 parts by weight of the stabilizer per 100 parts by weight of the vinyl halide resin.

The vinyl halide polymers which may be employed in the compositions of this invention are the resinous products obtained by the polymerization of a vinyl halide in the presence or absence of another polymerizable compound. The term "vinyl halide resin" includes vinyl halide homopolymers, such as polyvinyl chloride and polyvinyl bromide, as well as copolymers, such as those formed between a vinyl halide and at least one other polymerizable monoolefin, such as vinyl acetate, vinyl propionate, vinyl butyrate, vinylidene chloride, styrene, methyl methacrylate, dialkyl fumarate or maleate, and the like. The vinyl halide used is ordinarily and preferably the chloride, although the bromide and fluoride may also be used. The copolymers useful in the practice of this invention are those prepared from at least 70% of vinyl halide and up to 30% of the other polymerizable monoolefinic compound.

While the stabilizing compounds of the present invention may be used in vinyl halide compositions containing a wide variety of inorganic fillers, they are of particular value in asbestos-filled vinyl halide compositions, such as those that are used in the preparation of floor coverings. Included among the inorganic fillers that may be used in the compositions of the present invention are both fibrous and non-fibrous fillers. While either type of filler may be used as the sole inorganic filler, the novel compositions generally contain both fibrous and non-fibrous fillers.

The fibrous fillers that may be used in the novel vinyl halide compositions include asbestos and the mineral wools. Asbestos is the most commonly used and the preferred fibrous filter. It is usually present in the composition in the amount of approximately 50 to 200 parts and preferably 80 to 150 parts by weight per 100 parts by weight of the vinyl halide resin. Any of the commercially available grades of asbestos which are commonly used in the preparation of floor covering compositions may be used in the practice of this invention.

The useful non-fibrous inorganic fillers include the many materials that are commonly employed as fillers by the plastics industry. These include, for example, calcium carbonate, calcium sulfate, calcium silicate, barium carbonate, barium sulfate, silica, china clay, kaolin, fuller's earth, and magnesium silicate as well as such pigments as titanium dioxide, lead chromate, and iron oxide. The non-fibrous fillers are generally used in amounts ranging rom 50 to 300 parts and preferably from 100 to 200 parts by weight per 100 parts by weight of vinyl halide resin. While a single non-fibrous filler may be used, a mixture of two or more of these fillers which includes at least one pigment is most of ten used.

Any of the usual plasticizers for vinyl halide resins may be used in the compositions of the present invention. These include, for example, dioctyl phthalate, dibutyl sebacate, tricresyl phosphate, and the like. The amount of plasticizer which is used is generally within the range of about 5 to 100 parts by weight per 100 parts by weight of vinyl halide resin, with about 15 to 50 parts preferred.

In addition to the ingredients described, other resin additives, such as extenders, solvents, binders, dyes, and the like may be present in the amounts ordinarily employed for the purposes indicated.

The stabilizers of the present invention may be added to the vinyl halide resin compositions in any convenient way. For example, the vinyl halide resin, stabilizer, and other ingredients may be mixed with or without the aid of a volatile solvent and the resulting mixture milled on rolls at 200° F. to 350° F. until it is completely homogeneous. The stabilized resin may then be removed from the mill in the form of a film or sheet of the desired thickness and may be used as such or subjected to a polishing or embossing treatment.

To demonstrate the effectiveness of the novel stabilizers in asbestos-filled vinyl halide resinous compositions, a series of compositions was prepared which contained either one of the stabilizers of the present invention or another stabilizer. In each case a mixture of a vinyl halide resin, asbestos, calcium carbonate, dipropylene glycol dibenzoate, epoxidized soybean oil, titanium dioxide, and the stabilizer was blended at room temperature and then milled for 5 minutes on a two-roll differential speed mill whose roll temperature was maintained at 300° F. The compositions were removed from the rolls as milled sheets, 0.045 inch in thickness, and allowed to cool.

The heat stability of the compositions was determined by placing 1 x 1 inch specimens which had been cut from the milled sheets in a forced-circulation air oven at an elevated temperature and removing specimens periodically until considerable degradation had taken place as indicated by color change. A color rating scale was adopted for purposes of comparison of color and consequently comparison of stabilizing efficiency.

EXAMPLE 1

To a mixture of 100 parts of an 80% vinyl chloride–20% vinyl acetate copolymer, 100 parts of asbestos, 160 parts of granular calcium carbonate, 18 parts of dipropylene glycol dibenzoate, 2.5 parts of epoxidized soybean oil, and 12 parts of titanium dioxide was added 1 part of a stabilizer. The mixture was blended at room temperature and then charged to a two-roll, steam-heated, differential speed mill whose roll surface temperature was maintained at 300° F. The mixture was milled for 5 minutes and then removed from the rolls as a flexible, homogeneous sheet, 0.045 inch in thickness. To determine their heat stability 1 x 1 inch specimens of the compositions were placed in a forced-circulation air oven at 300° F., and specimens were removed periodically until appreciable darkening had taken place. The heat stability ratings of a series of the stabilized compositions of the present invention are given in Table I. In this table and in the tables that follow a numerical scale is used to indicate the color of specimens, with a rating of 1 indicating a pale gray color which is the inherent color imparted by the asbestos and other fillers to the vinyl halide resin and 10 a very dark gray color, the darkening being the manifestation of thermal degradation.

*Table I.—Heat Stability of Compositions Containing 1% of Stabilizer*

| Stabilizer | Initial Color | Color After Indicated Number of Minutes at 300° F. | | | | | | | | |
|---|---|---|---|---|---|---|---|---|---|---|
| | | 15 | 30 | 45 | 60 | 75 | 90 | 105 | 120 | 135 | 150 |
| Melamine | 1 | 1 | 1 | 1 | 1 | 1 | 1 | 1 | 1 | 1 | 1 |
| Dicyandiamide | 1 | 1 | 1 | 1 | 1 | 1 | 1 | 1 | 1 | 2 | 2 |
| Benzoguanamine | 1 | 1 | 2 | 2 | 2 | 2 | 3 | 3 | 3 | 3 | 3 |
| Melam | 2 | 2 | 2 | 2 | 2 | 2 | 2 | 2 | 2 | 2 | 2 |
| Guanidine Carbonate | 2 | 2 | 3 | 3 | 3 | 3 | 3 | 3 | 3 | 3 | 3 |
| Triphenylmelamine | 2 | 2 | 3 | 3 | 3 | 3 | 3 | 3 | 3 | 3 | 3 |

COMPARATIVE EXAMPLE

A series of compositions was prepared using the formulation and procedure described in Example I. The stabilizers used were either compounds related in structure to those of the present invention or compounds used commercially in the stabilization of asbestos-filled vinyl halide resins. The heat stability ratings of these compounds are given in Table II.

*Table II.—Heat Stability of Compositions Containing 1% of Comparative Stabilizers*

| Stabilizer | Initial Color | Color After Indicated Number of Minutes at 300° F. | | | | | | | | |
|---|---|---|---|---|---|---|---|---|---|---|
| | | 15 | 30 | 45 | 60 | 75 | 90 | 105 | 120 | 135 | 150 |
| Triacetoxymelamine | 2 | 2 | 3 | 4 | 8 | 8 | 8 | 8 | 8 | 8 | 8 |
| Cyanuric Chloride | 2 | 6 | 8 | 8 | 8 | 8 | 8 | 8 | 8 | 8 | 8 |
| Cyanuric Acid | 3 | 4 | 8 | 8 | 8 | 8 | 8 | 8 | 8 | 8 | 8 |
| 2,4,6-Triphenyl-s-triazine | 3 | 4 | 8 | 8 | 8 | 8 | 8 | 8 | 8 | 8 | 8 |
| Urea | 1 | 3 | 4 | 6 | 8 | 8 | 8 | 8 | 8 | 8 | 8 |
| Pentaerythritol | 1 | 2 | 3 | 4 | 6 | 8 | 8 | 8 | 8 | 8 | 8 |

The data presented in Tables I and II indicates that while triacetoxymelamine, urea, and pentaerythritol when used as stabilizers for asbestos-filled vinyl halide resins form products having satisfactory initial color and a degree of heat stability none of these compounds stabilizes the resin for an appreciable period of time and none is as effective as the compounds listed in Table I as a stabilizer for asbestos-filled vinyl halide resins. The other compounds included in the comparative test, that is, cyanuric chloride, cyanuric acid, and 2,4,6-triphenyl-s-triazine showed little activity as heat stabilizers.

EXAMPLE 2

Compositions were prepared using the formulation and procedure described in Example 1 but using 3 parts of the stabilizer per 100 parts of vinyl halide resin. The heat stability of these compositions was determined by heating one series of specimens at 300° F. and another series at 325° F. The heat stability ratings of these compositions are given in Tables III and IV.

*Table III.—Heat Stability of Compositions Containing 3% of Stabilizer*

| Stabilizer | Initial Color | Color After Indicated Number of Minutes at 300° F. | | | | | | | | |
|---|---|---|---|---|---|---|---|---|---|---|
| | | 15 | 30 | 45 | 60 | 75 | 90 | 105 | 120 | 135 | 150 |
| Melamine | 1 | 1 | 1 | 1 | 1 | 1 | 1 | 1 | 1 | 1 | 1 |
| Pentaerythritol | 1 | 1 | 1 | 1 | 1 | 1 | 1 | 1 | 1 | 1 | 2 |
| Urea | 1 | 1 | 2 | 3 | 5 | 6 | 8 | 8 | 8 | 8 | 8 |

*Table IV.—Heat Stability of Compositions Containing 3% of Stabilizer*

| Stabilizer | Initial Color | Color After Indicated Number of Minutes at 325° F. | | | | | | | | |
|---|---|---|---|---|---|---|---|---|---|---|
| | | 15 | 30 | 45 | 60 | 75 | 90 | 105 | 120 | 135 | 150 |
| Melamine | 1 | 1 | 1 | 1 | 1 | 1 | 2 | 2 | 2 | 2 | 2 |
| Pentaerythritol | 1 | 1 | 1 | 1 | 3 | 5 | 8 | 8 | 8 | 8 | 8 |

The data in the foregoing tables clearly demonstrate that the novel stabilized compositions of the present invention are discolored less and at a slower rate on heating than are any of the comparative compositions. Thus it is shown in Tables I through III that asbestos-filled vinyl halide resin compositions containing melamine have far better heat stability than the corresponding compositions which contain urea. Compositions containing 1 part of melamine per 100 parts of vinyl halide resin have been shown to have better heat stability than compositions containing the same amount of pentaerythritol. When 3 parts of stabilizer is used per 100 parts of vinyl halide resin, the composition containing pentaerythritol is approximately as stable as that containing melamine when tested at 300° F. for 150 minutes, but appreciably less stable when tested at 325° F.

While this invention has been described with respect to certain embodiments, it is not so limited, and it is to be understood that variations and modifications thereof may be made without departing from the spirit or scope of this invention.

Two continuing applications have been filed; namely, Serial Nos. 227,998 and 227,999, both in October 3, 1962.

I claim:

1. A heat stable resinous composition comprising a vinyl halide resin, asbestos, and a heat-stabilizing amount of melamine.

2. A heat stable resinous composition comprising a vinyl halide resin, asbestos, and melamine in amounts of 50 to 200 parts by weight of asbestos and 0.3 to 10 parts by weight of said melamine per 100 parts by weight of said vinyl halide resin.

3. The heat stable resinous composition of claim 2 wherein the vinyl halide resin is a vinyl chloride-vinyl acetate copolymer.

4. A heat stable resinous composition comprising a vinyl halide resin, asbestos, a non-fibrous inorganic filler, and melamine in the amount of 50 to 200 parts by weight of asbestos, 50 to 300 parts by weight of said non-fibrous filler, and 1 to 5 parts by weight of melamine per 100 parts by weight of said vinyl halide resin.

5. A heat stable resinous composition comprising a vinyl halide resin, asbestos, a non-fibrous inorganic filler component comprising at least one pigment, and melamine in the amount of 50 to 200 parts by weight of asbestos, 50 to 300 parts by weight of said non-fibrous inorganic filler component, and 1 to 5 parts by weight of melamine per 100 parts by weight of said vinyl halide resin.

6. The heat stable resinous composition of claim 5 wherein 80 to 150 parts by weight of asbestos, 100 to 200 parts by weight of said non-fibrous inorganic filler component, and 1 to 5 parts by weight of melamine are used per 100 parts by weight of said vinyl halide resin.

References Cited in the file of this patent

UNITED STATES PATENTS

| | | |
|---|---|---|
| 2,367,483 | Cheyney | Jan. 16, 1945 |
| 2,410,775 | Cox et al. | Nov. 5, 1946 |
| 2,419,166 | Rogers et al. | Apr. 15, 1947 |
| 2,491,443 | Cox et al. | Dec. 13, 1949 |
| 2,627,504 | Hardy | Feb. 3, 1953 |
| 2,837,490 | Hecker | June 3, 1958 |
| 2,867,594 | Hansen et al. | Jan. 6, 1959 |
| 2,899,398 | Pflaumer | Aug. 11, 1959 |
| 2,930,083 | Vostovich et al. | Mar. 29, 1960 |
| 2,985,619 | Roos et al. | May 23, 1961 |

FOREIGN PATENTS

| | | |
|---|---|---|
| 522,953 | Canada | Mar. 20, 1956 |

OTHER REFERENCES

Smith, H. V.: "Stabilizers for Vinyl Polymers," Part 4, British Plastics, August 1954, pages 307–311.